United States Patent
Tateishi et al.

(10) Patent No.: US 6,203,704 B1
(45) Date of Patent: Mar. 20, 2001

(54) METHOD FOR SEPARATING OBJECTIVE COMPONENT

(75) Inventors: Yasuhiro Tateishi, Tokyo; Yoichi Shimoi, Kanagawa, both of (JP)

(73) Assignee: Nittetu Chemical Engineering Ltd., Tokyo (JP)

( * ) Notice: Subject to any disclaimer, the term of this patent is extended or adjusted under 35 U.S.C. 154(b) by 0 days.

(21) Appl. No.: 09/290,998

(22) Filed: Apr. 14, 1999

(30) Foreign Application Priority Data

Apr. 14, 1998 (JP) .................................................. 10-139099

(51) Int. Cl.[7] .................................................. B01D 11/00
(52) U.S. Cl. ..................... 210/634; 210/774; 210/805; 210/806; 210/669
(58) Field of Search ..................... 210/138, 194, 210/195.1, 195.3, 198.1, 205, 206, 257.1, 258, 259, 511, 634, 639, 805, 806, 641, 774; 422/256

(56) References Cited

U.S. PATENT DOCUMENTS

| 2,272,951 | | 2/1942 | Morf et al. | |
|---|---|---|---|---|
| 4,159,248 | * | 6/1979 | Taylor et al. | 210/195.3 |
| 4,277,445 | * | 7/1981 | De Schepper et al. | 210/195.3 |
| 5,273,654 | * | 12/1993 | Severing | 210/805 |
| 5,334,317 | * | 8/1994 | Bannach Sichtermann et al. | 210/805 |
| 5,575,921 | * | 11/1996 | Askin et al. | 210/805 |
| 5,772,783 | * | 6/1998 | Stucker et al. | 210/805 |
| 5,948,263 | * | 9/1999 | Chaiko et al. | 210/805 |
| 6,039,879 | * | 3/2000 | Shimoi et al. | 210/650 |

FOREIGN PATENT DOCUMENTS 36 15 137    7/1987   (DE) .

* cited by examiner

*Primary Examiner*—Joseph W. Drodge
(74) *Attorney, Agent, or Firm*—Oblon, Spivak, McClelland, Maier & Neustadt, P.C.

(57) ABSTRACT

A method for separating an objective component from a crude material in a time lagged multi-stage counter flow system, comprising: (a) contacting the crude material with a washing liquid or an extracting reagent in a semi-batch system to form a mixture of the crude material and the washing liquid or extracting reagent; (b) separating the mixture into a recovered liquid containing the objective component and a residue, with the proviso that the mixture is not separated with a separation membrane that is connected to a tank containing the crude material; and repeating (a) and (b) at least once, wherein the concentration of the objective component is successively lower in the washing liquid or extracting reagent contacted with the crude material in each (a).

17 Claims, 4 Drawing Sheets

FIG. 4

METHOD FOR SEPARATING OBJECTIVE COMPONENT

BACKGROUND OF THE INVENTION

1. Field of the Invention

The present invention relates to a method for separating an objective component including a valuable substance or an impurity, such as a salt, that is produced in the fermentation industry, the pharmaceutical industry, the sugar manufacturing industry, the protein and amino acid industry, the food industry, the dye industry, the pigment industry, the chemical industry, the metal refining industry, the field of waste disposal, and the like. More particularly, the invention relates to a method for efficiently separating an objective component from various crude materials through a combination of washings or extractions and a separation other than membrane treatment.

2. Discussion of the Background

Industrial production in the fermentation industry, the protein and amino acid industry, and the pharmaceutical industry involve culturing of microorganisms for production of amino acids, brewing, production of antibiotics, and the like. For example, a crude liquid product containing a valuable substance, such as an amino acid, is separated from a fermentation broth by means of a separation membrane, a centrifugal separator, etc., and an objective component (valuable substance) is separated from the crude liquid product by evaporation using steam or a like operation, while leaving microbial cells as a residue.

In the dye industry, the pigment industry, the chemical industry, etc., salting out is carried out in production processes, which necessitates removal of the salt as an impurity.

Recovery of any valuable substance remaining in the above-mentioned residue or removal of the salt has been carried out by filtration, decantation, and the like. These conventional techniques for recovery or removal of such an objective component require a large quantity of washing water, which results in an increased amount of drainage and necessitates large-scale installations for drainage disposal. In addition, an appreciable amount of the valuable substance (e.g., dye) unavoidably migrates to the material to be disposed, leading to product loss.

In the dye industry, the pigment industry, the chemical industry and the metal refining industry, extraction has been presently used, and multi-stage extraction has been adopted to recovery of an objective component (valuable substance). In these cases, too, a large quantity of an extracting reagent has been used, and a large amount of energy has been consumed for the subsequent separation of the valuable substance or for drainage disposal.

SUMMARY OF THE INVENTION

An object of the present invention is to provide a method for separating and recovering a valuable substance in a high concentration at an improved recovery from a crude liquid, such as a concentrated microbial cell suspension which remains after a liquid product (a valuable substance-containing liquid) is separated from a culture of a microorganism in the sugar industry, the fermentation industry, the protein and amino acid industry, and the like.

Another object of the invention is to provide a method for separating and removing an impurity, such as a salt, at an improved removal from a dye or pigment-containing crude liquid having been subjected to salting out.

Yet another object of the invention is to provide a method for separating and removing soluble components from ash after incineration for waste disposal.

Still another object of the invention is to provide an efficient and economical method for separating an objective component which makes it possible to reduce the requisite amount of a washing liquid, such as water, or an extracting reagent to reduce the waste liquid.

A further object of the invention is to improve a recovery of an objective component thereby improving the economy and also to provide a final recovered liquid containing the objective component in a high concentration thereby minimizing the energy for subsequent steps such as concentration by steaming.

As for equipment, the present invention aims at carrying out the above-described separation operation by use of a compact and convenient apparatus that does not need such a large space for installation as is required for a continuous system.

The objects of the present invention, and others, may be accomplished with a method for separating an objective component from a crude material in a time lagged multi-stage counter flow system, comprising:

(a) contacting the crude material with a washing liquid or an extracting reagent to form a mixture of the crude material and the washing liquid or extracting reagent;

(b) separating the mixture into a recovered liquid containing the objective component and a residue, with the proviso that the mixture is not separated with a separation membrane that is connected to a tank containing the crude material; and repeating (a) and (b) at least once, wherein the concentration of the objective component is successively lower in the washing liquid or extracting reagent contacted with the crude material in each (a).

An important feature of the inventive method is that the contacting (a) and separating (b) are repeated at least once, i.e., there are at least two contacting-separating cycles in the method. In each contacting (a), a washing liquid or an extracting reagent is used. The concentration of the objective component in the washing liquid or an extracting reagent is successively lower in each (a). Therefore, the concentration of the objective component in the washing liquid or extracting reagent will be highest in the first (a) and lowest in the last (a), with intermediate concentrations for other, optional, contacting-separating repeats in the method. In fact, the washing liquid or an extracting reagent used in the last (a) of the method substantially free of the objective component, i.e., may contain no detectable amount of the objective component.

A: Crude material tank
B: Hopper for feeding crude material
C: Conveyer
D: Container for washing liquid or extracting reagent
E: Recovered liquid tank
F: Filter press
P: Pump
G: Separation unit
H: Residue tank
J: Repulper
K: Mixing tank
L: Extraction residue tank
FCV: Flow control valve
LCV: Liquid level control valve
a, b, c, d, e, f, and g: Valves

DETAILED DESCRIPTION OF THE INVENTION

In the present invention, the steps (a) and (b) are preferably conducted simultaneously; however, the steps (a) and (b) are repeated intermittently, or the step (b) is carried out subsequently to the step (a).

One embodiment of the present invention relates to the above-described method, wherein the crude material is stored in a tank; (b) is conducted in a separating means; the crude material is transferred to the separating means while feeding the washing liquid or extracting reagent to a system comprising the separating means and a transporting means connecting the tank and the separating means, to form a mixture of the washing liquid or extracting reagent and the crude material; and the mixture is separated by the separating means into a recovered liquid having a higher concentration of the objective component than the washing liquid or extracting reagent and a residue.

Another embodiment of the present invention relates to the above-described method, wherein the recovered liquid obtained from the first (b) is taken out of the system; and the recovered liquid from each (b) other than the first (b) is returned (recycled) to the system for use as the washing liquid or extracting reagent in (a) and (b) which is used for treating in the subsequent cycle to the batch feed of a raw material.

The crude material stored in the tank may be transferred to a separating means while feeding one of the washing liquids or extracting reagents to a system comprising the separating means and a transporting means connecting the tank and the separating means to form a mixture of the washing liquid or extracting reagent and the crude material, and the mixture is separated by the separating means into a recovered liquid having a higher concentration of the objective component than the washing liquid or extracting reagent fed and a residue.

One, or more than one, tank can be used for storing the crude material.

In one embodiment of the above-described method for separating the objective component, a recovered liquid obtained by using a first washing liquid or extracting reagent, having the highest objective component concentration of the plurality of washing liquids or extracting reagents used, is taken out of the system, a residue obtained by using a final washing liquid or extracting reagent having the lowest objective component concentration of the plurality of washing liquids or extracting reagents is taken out of the system, a recovered liquid obtained by using each of the plurality of washing liquids or extracting reagents other than the first washing liquid or extracting reagent is returned to the system for use as the plurality of washing liquids or extracts in the cycle of a next batch of a crude material, and the last residue of the batch by using the last washing liquids or extracting reagent is taken out of the system.

The inventive method includes an embodiment in which the recovered liquid, rich in a valuable substance which has been separated from the crude material, is taken out of the system, and an embodiment in which a residue, rich in a valuable substance, is separated from the crude material. Valuable substances in the present invention include amino acids, etc. which can be recovered from a fermentation broth, etc. in the above-described various industrial fields. The valuable substance may be a final product or an intermediate thereof. In the following description, a liquid containing a valuable substance may be sometimes called a product liquid.

The inventors have previously proposed a method for efficiently separating and recovering an objective component from a crude liquid containing the objective component by a combination of a washing operation and a membrane treatment (see EP-A-0838256). As a result of further investigation, the inventors have confirmed that the principle of the above proposal also applies to separating means other than membrane treatment. The present invention has been completed based on this confirmation and addition of further improvements.

Taking into consideration a recovery of a product (valuable substance) or a removal of an impurity (e.g., salt), the present invention uses a semi-batch system in which a crude material to be treated is supplied batchwise, and a washing liquid or an extracting reagent is supplied continuously or intermittently, while adding improvements to the step of washing or extraction.

Unlike a conventional semi-batch system which has been carried out by using a large quantity of a washing liquid, such as water, or an extracting reagent in the beginning of the washing or extraction step, the separating system adopted in the present invention is characterized in that a plurality of washing liquids or extracting reagents containing an objective component in different concentrations are prepared and used in descending order of concentration of the objective component therein.

The crude material used in the invention can be either solid or liquid. Whether washing or extraction is used depends on the particular purpose. Preferred crude materials are those which can be transferred from their containers to a separating means in the form of a solution, a suspension or a slurry.

According to the present invention, the requisite amount of the washing liquid, such as water, or the extracting reagent can be diminished, and the recovery of the product (valuable substance) or the removal of the impurity, such as salt, can be increased, which also leads to reduction of drainage.

In a series of washing operations or extracting operations using a washing liquid or an extracting reagent for separating a liquid rich in an objective component (recovered liquid) by a separating means other than a separation membrane, the practice of the present invention includes an embodiment in which a valuable substance passes into the recovered liquid side and an embodiment in which an impurity, such as a salt, passes into the recovered liquid side while leaving a residue rich in a valuable substance. Both cases can be accounted for as the same phenomenon in principle. Accordingly, the term "objective component" as used herein refers to a component that is to be transferred into the recovered liquid side through a separation operation irrespective of whether or not it is a desired component, such as an amino acid, a metal, and a salt. Recovery of an amino acid, etc. from a fermentation broth comes under the former case. In this case, an amino acid is transferred to the recovered liquid side so that the "objective component" in a crude material agrees with the valuable substance to be recovered. On the other hand, desalting of a dye- or pigment-containing crude liquid is included under the latter case, that is, the salt is the "objective component" to be transferred into the recovered liquid side through washing or extraction, while the dye or pigment remaining in the residual liquid is the valuable substance. In the field of waste disposal by incineration, soluble components are removed from ash as objective components while leaving insoluble ash as a residue.

The circulating system which can be used for carrying out the present invention comprises a tank for storing a crude material, a separating means, and a means for transferring the crude material which connects the tank and the separating means, such as a pump, a pipe, a mixer, a feeder, a conveyer, etc. A washing liquid or extracting reagent that is stored separately is fed either continuously or intermittently to an appropriate part of the circulating system, and the objective component is separated by the separating means in parallel with the feed of the washing liquid or extracting reagent.

The separating means, which constitutes a part of the circulating system, is a separation unit having a solid-liquid separating function, a heavy liquid-light liquid separating function, an extracting function, and the like for carrying out separation of the objective component from the crude material. Any known separation unit can be used as far as it is capable of receiving a crude material containing an objective component in the form of liquid or a mixture of liquid and solid and of separating the objective component from the fed crude material. Not only a unit merely having a separating function but a unit which achieves separation while inducing a reaction or a change of the objective component are useful.

Accordingly, separation techniques applicable to the separating means include solid-liquid separation (e.g., filtration and centrifugal separation), liquid—liquid separation, liquid film separation, extraction, distillation, evaporation, adsorption, ion exchange, freezing separation, crystallization, and the like. If desired, a reaction unit can be used in combination. Preferred separation units are those capable of performing a separation operation in a continuous manner.

Solid-liquid separation (e.g., filtration and centrifugal separation) and liquid—liquid separation are useful for separating an objective component from a crude material as shown in the Examples described below. A liquid film separation unit or a multi-stage extraction unit achieves separation of an objective component at higher efficiency than a simple heavy liquid-light liquid separator, a mixer settler, a coalescer, etc. and is preferably used for high efficiency separation. A distillation unit, an evaporation unit, an ion exchange unit, and a freezing separation unit have been known as an efficient separating means and are useful in the present invention as an efficient means for separating an objective component.

In addition to the storing means, a separating means and a transferring means, the circulating system can further comprise a buffering means for averaging the material to be handled or for preventing an abrupt change of the material, such as a mediating tank, a stirring means for securing sufficient contact of materials, a grinding means for making a solid material into a suspension, a slurry, etc. easier to handle, a strainer for removing solid matter difficult to handle, and so forth.

Only one separating unit having the above-described separating function would be enough to carry out the present invention because a batch of a crude material is repeatedly subjected to a separation operation through the same unit in at least two stages in a time-lagged semi-batch system. If desired, a plurality of the separating units, which may be the same or different, can be used to process an increased throughput.

The crude material tank is a container supplied with a prescribed amount of a crude material to be treated from a hopper, etc. Where the crude material is solid, part of a washing liquid or extracting reagent is fed to the crude material tank to make it flowable. Where the crude material is liquid, the crude material as stored in the tank is mixed with a washing liquid or extracting reagent. The crude material tank may be equipped with a stirrer, etc. according to necessity.

There may be one or more than one tanks for a crude material. In using one tank for storing a crude material, the separation residue, which is left after separating a recovered liquid rich in an objective component in the separation unit, is returned to the crude material tank either directly or after once reserved in a separate container.

In using two or more crude material tanks, they are used alternately or successively in such a manner that the crude material from a first tank is separated into a recovered liquid containing the objective component and a separation residue, and the residue (left after separation of the recovered liquid) is then transferred to a second tank and subjected to a next stage of treatment. In the next stage, the separated residue is returned to the first tank (in case of using two tanks) or a third tank (in case of using three or more tanks). Use of two or more tanks for storing the crude material is advantageous in that the contents of the first tank can be subjected to a separation treatment as it is since the separated residue is transferred to another tank, thereby achieving efficient separation of the objective component and making it easier to handle the crude material.

The transferring means connecting the crude material tank and the separation unit is not particularly limited. Where the residue left after separating a recovered liquid has flowability, the separation unit and the crude material tank can be connected by piping. Where the residue has poor flowability, it can be transferred by an appropriate means, such as a screw feeder, a belt feeder, a conveyer, and so forth.

As described above, a plurality of washing liquids or extracting reagents having different concentrations of the objective component are fed successively with a time lag in descending order of the concentration to carry out washing or extraction in multiple stages and that the recovered liquids separated in the washing or extraction stages other than the first stage are taken advantage of as a washing liquid or an extracting reagent to be used in the next cycle of washing or extraction. In the present invention, such a mode of operation is referred to as a "time-lagged multi-stage counterflow system". The recovered liquid from each (b) can be used as the washing liquid or extracting reagent in a next cycle for the next batch of the original crude material.

In the present invention, a series of operations from a first stage of treating a batch of a crude material with a first washing liquid or extracting reagent having the highest objective component concentration as compared with all the washing liquids or extracting reagents used in the method up to a final stage of treating the same batch with a final washing liquid or extracting reagent makes up one treating cycle. The treating cycle is repeated until a desired amount of the crude material is treated.

In other words, a concentration profile of the objective component after performing many numbers of treating cycles for each batch of a raw material which is in similar quantity and in similar characteristic is a result of the "time lagged multi-stage counter flow system".

Also, the profile may be converged because the washing liquids or extracting reagents having different concentrations of the objective component are fed successively in descending order of the concentration to carry out washing or extraction in multiple stages.

Several examples of the concentration profile are described in Examples 1 to 4 described below.

The contacting (a)-separating (b) in the cycle is conducted at least two times. Of course the number of contacting (a)-separating (b) stages may be more than two. The number of contacting (a)-separating (b) stages in the cycle may be two, three, four, five, six, seven, eight, nine, ten or more.

The recovered liquid obtained in each stage other than the first stage, which is to be used as a washing liquid or extracting reagent in the next cycle, can be sent directly to the respective container or it can be temporarily kept in a reservoir before it is transferred to the container for the sake of convenience for system design or for subsequent steps. The concentration of the recovered liquid can be adjusted while in the reservoir.

In the present invention, the final stage of washing or extraction is conducted by using a final washing liquid or extracting reagent having the lowest objective component concentration as compared with all the washing liquids or extracting reagents used in the cycle, and may contain no objective component. The objective component concentration of the final washing liquid or extracting reagent is appropriately decided according to the purpose of the treatment. Where the water content of the finally separated residue can be separated by concentration or condensation, the water thus separated is substantially freed of impurities as a result of sufficient washing treatment so that it could be utilized for the final washing stage. This is particularly beneficial in cases where the finally obtained residue has a high water content. According to this manipulation, the waste water discharged out of the system can be diminished further, which also leads to reduction of the whole residue.

The washing liquid or extracting reagent to be used is desirably selected in conformity with the characteristics or physical properties of the objective component and the crude material. A wide variety of organic or inorganic liquids, such as water, alcohols, amines, chelating agents (e.g., oxine, dithizone, and cupferron), organic acids, inorganic acids, alkali solutions, kerosine, heavy oils, and other various organic solvents, are useful. If desired, the washing liquid or extracting reagent can contain additives, such as a coagulant, a dispersant, a surfactant, a pH adjusting agent, a defoaming agent, and the like as far as the valuable substance to be recovered is not adversely affected.

The circulating system may be equipped with a temperature control mechanism, such as a heat exchanger, to maintain the treating temperature at an optimum temperature.

The amount and objective component concentration of the washing liquid or extracting reagent can be set arbitrarily taking into consideration the characteristics of the crude material and the objective component to be separated, the operational conditions such as the treating time, the design specifications, and the like.

As can be understood from the foregoing, the crude material which can be treated by the method of the present invention includes a material left after separating a valuable component through various solid-liquid separation steps in the fermentation industry, the pharmaceutical industry, the sugar manufacturing industry, the protein and amino acid industry, the food industry, etc. which still contains the objective component together with the separation residue; a material having been subjected to salting out and containing a valuable substance together with a salt in the dye industry, the pigment industry, the chemical industry, etc.; finely divided natural minerals; a secondary material obtained by treatment of natural minerals; the residue or ash after waste disposal; waste water after various treatments; and the like.

While the practice of carrying out the present invention has been described chiefly with reference to a washing operation, the present invention is similarly applicable to an extraction operation frequently employed in the dye industry, the pigment industry, the chemical industry, the metal refining industry, and the like. Extraction can be carried out basically in the same manner as described above simply by displacing the washing operations with extraction operations to produce the same effects. Accordingly, the crude materials to which the present invention applies will be easily understood by those skilled in the art from the foregoing description.

According to the present invention, an objective component can be separated from various solids, liquids or mixtures thereof, such as a fermentation broth, a liquid containing a chemical reaction product and an impurity, a liquid after pretreatment of minerals, a liquid after waste disposal, and a residue or waste water after waste disposal. The present invention makes it possible to improve a recovery of the objective component, leaving a final residue with a reduced content of the objective component while diminishing the quantities of a washing liquid, water or extracting reagent to be used for the treatment.

The present invention serves to reduce industrial drainage and to permit recycling various industrial waste and makes a contribution to minimize the energy for post treatments such as concentration. That is, waste water can be treated with a smaller amount of a chemical, and the recovered liquid contains the objective component in high concentration, which saves the energy required for the subsequent steps, such as steam required for concentration, and the like. Compared with conventional methods, the technique of the invention provides great reduction in the steaming costs and achieves a satisfactory overall recovery of the objective component to reduce organic matter and the like in drainage to be discharged, thus contributing to reduction in load for drainage treatment, which will be easily recognized by one skilled in the art.

From the standpoint of equipment, the method of the present invention can be carried out in an apparatus that is more compact, needing less space for installation, and extremely simpler to control than conventional multi-stage treatment systems comprising a plurality of separation units connected in series.

The present invention will now be illustrated by way of Examples, but it should be understood that the present invention is not limited thereto, and various changes and modifications can be added thereto by one having ordinary skill in the art without departing from the spirit and scope of the present invention.

EXAMPLES

Example 1

In order to make ash left after refuse incineration reusable as a resource, the invention was applied to removal of soluble matter from incinerated ash.

Figure 1:
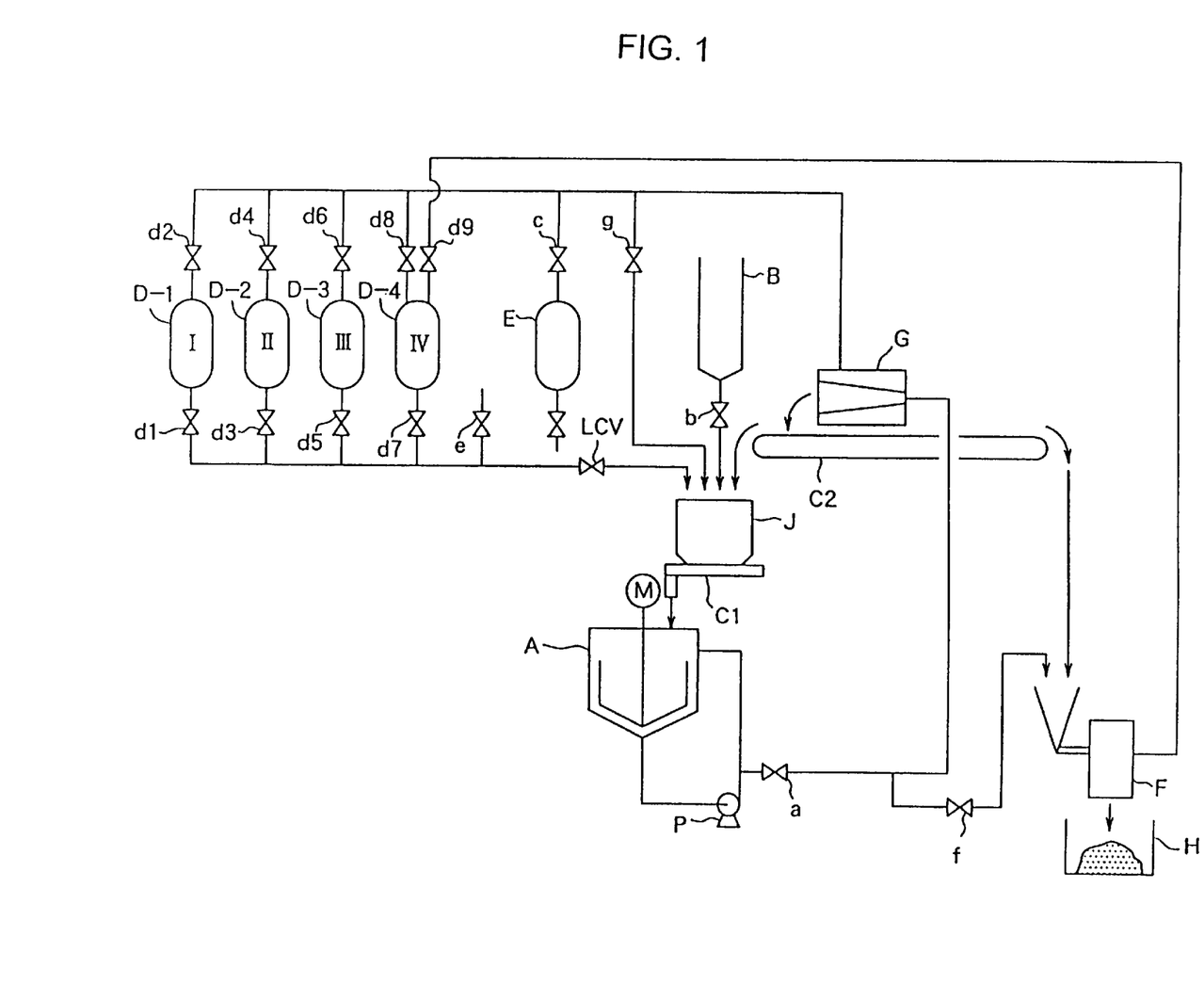
FIG. 1 schematically illustrates an example of the apparatus used for carrying out washing according to the present invention, in which one tank is used for storing a crude material.

An apparatus shown in FIG. 1 having a single crude material tank was used, in which a super decanter was used as a solid-liquid separation unit to remove soluble matter in the incinerated ash. In Example 1, the objective component contained in the crude material is a soluble substance that should be removed. Water was used as a washing liquid. In the description hereinafter given, the soluble substances contained in a crude material will be inclusively referred to as a salt content.

Being solid, the crude material (incinerated ash) was first made into a slurry as a pretreatment. A given batch of powdery incinerated ash stored in hopper B was delivered to crude material tank A through repulper J. At the same time, washing liquid I having a medium concentration was fed to repulper J by opening valve d1 as a diluting liquid, thereby to prepare an incinerated ash slurry having a solid content of about 15% by weight, which is suitable for handling. Meanwhile circulation was established from tank A through pump P and solid-liquid separation unit G back to tank A so that the concentrated slurry obtained in separation unit G was put into repulper J and the recovered liquid obtained in separation unit G was also sent to repulper J through valve g, and both were carried back to tank A through conveyer C1.

First Stage

Then the valve g was closed, and valves c and d1 were opened. With the pump P and a liquid level control valve (LCV) for controlling the liquid level of tank A operating, medium concentration washing liquid I which had been stored in container D-1 was slowly supplied to tank A containing the slurry. The slurry of tank A was sent to solid-liquid separation unit G via pump P, where it was separated into solid (concentration residue) and liquid (liquid containing the objective component in high concentration). The liquid thus separated was transferred to recovered liquid tank E. On the other hand, the concentration residue was repulped and returned to tank A. During this first washing stage, tank A was replenished with the same amount of the washing liquid I as the amount of the recovered liquid by means of the LCV so as to maintain the liquid level constant.

Second Stage

After a predetermined amount of medium concentration washing liquid I has been fed to evacuate container D-1, valves c and d1 were closed, and valves d2 and d3 were opened so that medium concentration washing liquid II in container D-2 (whose concentration was less than that of washing liquid I) was slowly fed to tank A while keeping the liquid level of tank A constant to carry out a second washing operation in the same manner as in the first stage. Meantime the recovered liquid from the separation unit G was transferred to tank D-1 and stored there for use as medium concentration washing liquid I in the next washing cycle.

Third Stage

On feeding a predetermined amount of medium concentration washing liquid II to evacuate container D-2, valves d2 and d3 were closed, and valves d4 and d5 were opened so that medium concentration washing liquid III in container D-3 (whose concentration was less than that of washing liquid II) was slowly fed to tank A while keeping the liquid level of tank A constant to carry out a washing operation in the same manner as in the second stage. During the third washing operation, the recovered liquid from the separation unit G was transferred to tank D-2 and stored there for use as medium concentration washing liquid II in t he next washing cycle.

Fourth Stage

After a predetermined amount of medium concentration washing liquid III was fed to evacuate container D-3, valves d4 and d5 were closed, and valves d6 and d7 were opened so that low concentration washing liquid IV in container D-4 (whose concentration was less than that of washing liquid III) can flow slowly to tank A while keeping the liquid level of tank A constant to carry out a washing operation in the same manner as in the preceding stages. During the forth washing operation, the recovered liquid from the separation unit G was transferred to tank D-3 and stored there for use as medium concentration washing liquid III in the next washing cycle.

Fifth Stage

Thereafter valves d6 and d7 were closed, and valves d8 and e were opened so that a predetermined amount of fresh water was slowly fed through valve e to tank A while maintaining the liquid level of tank A constant to effect a final washing stage. The recovered liquid from the separation unit G was forwarded to container D-4 and stored there for use as low concentration washing liquid IV in the next washing cycle.

After a predetermined amount of washing water has been fed to complete the final washing stage, the residue left in the separation unit G was shifted on conveyer C2 and dropped into filter press F, where it was squeezed into cake and recovered in residue tank H. The water separated by the squeezing was sent to container D-4 through open valve d9 for use as low concentration washing liquid IV.

During all the 1st to 5th stages of washing, tank A was replenished with the respective washing liquids stored in the respective containers or fresh water in an amount corresponding to the liquid recovered from the separation unit G so as to maintain the liquid level of tank A constant.

The washing cycle made up of the above-described 5 stages was repeated until the whole amount of the crude material was treated. At the end of the final washing stage of the final washing cycle, a liquid having a high salt content was recovered in the recovered liquid tank E while washed incinerated ash was accumulated in residue tank H.

The results of the above treatment are shown in Table 1 below. It is seen that the washed incinerated ash has a sufficiently decreased salt content.

TABLE 1

Washed of Salt Content in Incinerated Ash with Single Crude Material Tank

|  | Ash | Diluting Liquid | | Washing Liquid | | | | Final Stage | |
|---|---|---|---|---|---|---|---|---|---|
|  |  | weight | | 1st Stage | 2nd Stage | 3rd Stage | 4th Stage | Recovered Liquid | |
|  | g/batch | g/batch | ratio | g/batch | g/batch | g/batch | g/batch | g/batch | Remarks |
| Solid Content | 230 | 0 | | | | | | | 400 g of washing |
| Salt Content | 34 | 157 | 0.12 | 136 | 98 | 66 | 41 | 41 | water was used |
| Water Content | — | 1112 | 0.88 | 1337 | 1376 | 1407 | 1433 | 1433 | in the final |
| Total | | 1269 | 1.00 | 1473 | 1473 | 1473 | 1473 | 1473 | stage |

|  | Composition of Recovered | Diluted Crude Material | | Final Recovered Liquid | | | | Desalted Ash | |
|---|---|---|---|---|---|---|---|---|---|
|  | Liquid | | weight | 1st stage | 2nd stage | 3rd stage | 4th stage | | weight |
|  | g/batch | g/batch | ratio | g/batch | g/batch | g/batch | g/batch | g/batch | ratio |
| Solid Content | 230 | | | | | | | 230 | 0.50 |
| Content Salt | 191 | 25 | 0.12 | 182 | 136 | 98 | 66 | 9 | 0.02 |
| Water Content | 1112 | 179 | 0.88 | 1290 | 1337 | 1375 | 1407 | 221 | 48 |
| Total | 1533 | 204 | 1.00 | 1473 | 1473 | 1473 | 1473 | 469 | 1.00 |

Note:
The incinerated ash was made into an about 15 wt % slurry. An operation comprising separating the slurry into cake (solid content: about 50%) and a clear liquid in the separation unit while slowly adding the washing liquid and recovering the clear liquid was repeated.

In the 5-stage washing treatment of Example 1, it is only the 5th stage that used fresh water. The medium to low concentration washing liquids used in the 1st, 2nd, 3rd, and 4th stages of the cycle are recovered liquids obtained in the 2nd, 3rd, 4th and 5th stages in the former cycle of the cycle, respectively.

Example 2

Incinerated ash having the same composition as used in Example 1 was washed to remove the salt content. An apparatus shown in FIG. 2 was used, which is basically the same as the apparatus used in Example 1 except for having two crude material tanks for mixing and storing the crude material and the washing liquid or washing water.

Figure 2:
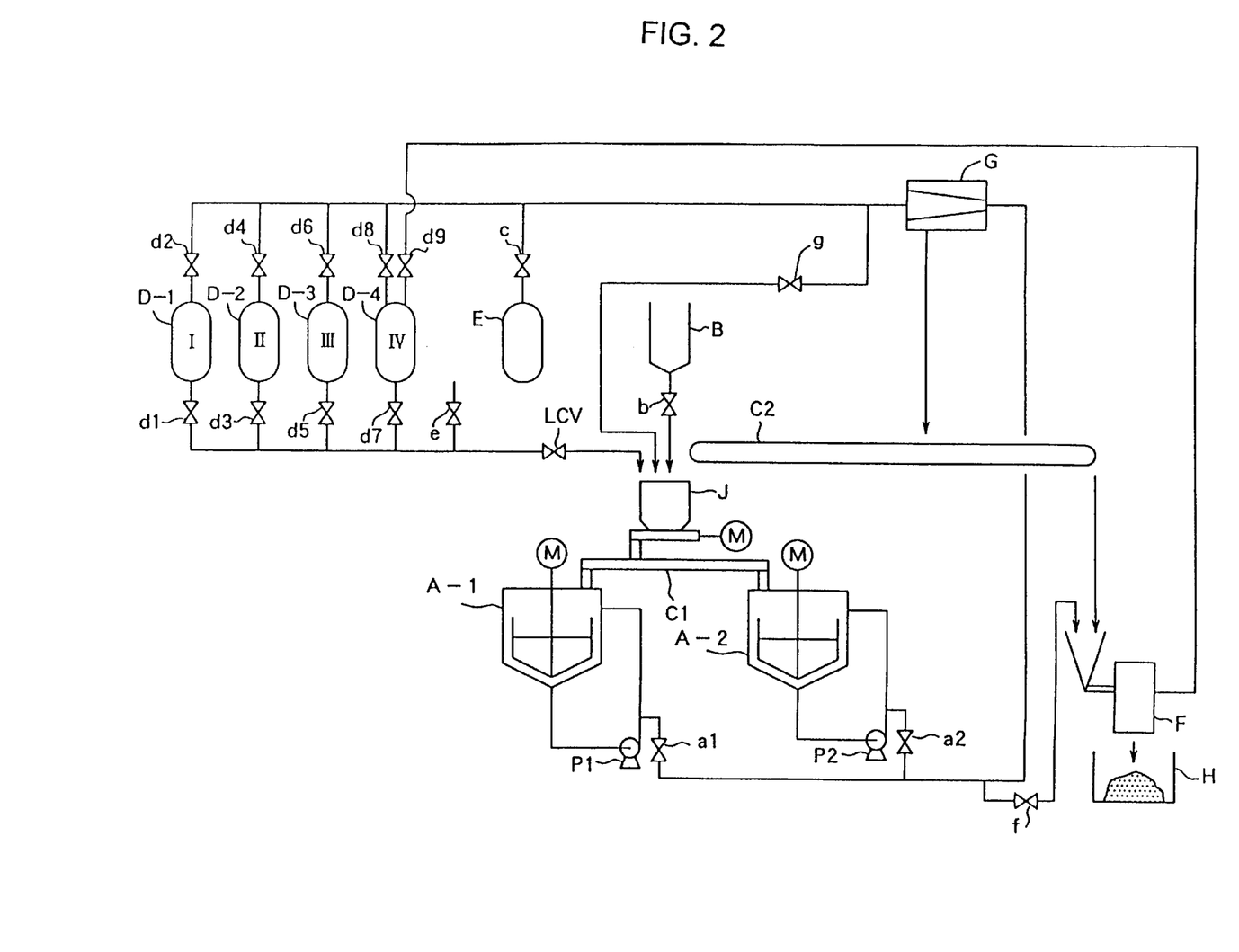
FIG. 2 schematically illustrates another example of the apparatus used for carrying out washing according to the present invention, in which two tanks are used alternately for storing a crude material.

As a pretreatment, a given batch of powdery incinerated ash stored in hopper B was supplied to crude material tank A-1 through repulper J. At the same time, washing liquid I having a medium concentration was fed to tank A-1 by opening valve d1 as a diluting liquid, thereby to prepare an incinerated ash slurry having a solid content of about 15% by weight, which is suitable for handling. Meanwhile circulation was established from tank A-1 through pump P and solid-liquid separation unit G back to tank A-1 so that the concentrated slurry obtained in separation unit G was put into repulper J and the recovered liquid obtained in separation unit G was also sent to repulper J through valve g, and both were carried back to tank A through conveyer C1.

The slurry thus prepared in tank A-1 was subjected to 5-stage washing using medium concentration washing liquids I, II and III, low concentration washing liquid IV, and finally washing water in the same manner as in Example 1 with the following exception.

Because two crude material tanks (A-1 and A-2) were used for mixing the crude material with the washing liquid or water, the slurry from tank A-1 was separated in the separation unit G into a residue and a liquid, and the residue was sent to tank A-2, while in the next stage a residue of the slurry from tank A-2 was sent to tank A-1. In other words, tanks A-1 and A-2 were used alternately. In many cases the amount of the washing liquid supplied from container D-1, D-2, D-3 or D-4 in one stage is greater than that of the liquid per batch that is stored in tank A-1 and then put in tank A-2 through separation unit G. In these cases tanks A-1 and A-2 are used alternately while the washing liquid is being used in one stage. Where three or more crude material tanks are used, the operation is carried out similarly.

The above-described cycle was repeated for each batch to treat a desired quantity of the crude material. The results of Example 2 are shown in Table 2.

TABLE 2

Washed of Salt Content in Incinerated Ash with Two Crude Material Tanks

|  | Ash g/batch | Diluting Liquid | | Washing Liquid | | | | Final Stage | |
|---|---|---|---|---|---|---|---|---|---|
|  |  | weight g/batch | ratio | 1st Stage g/batch | 2nd Stage g/batch | 3rd Stage g/batch | 4th Stage g/batch | Recovered Liquid g/batch | Remarks |
| Solid Content | 230 |  |  |  |  |  |  |  | 400 g of washing water was used in the final stage |
| Salt Content | 34 | 202 | 0.16 | 121 | 60 | 26 | 8 | 8 |  |
| Water Content | — | 1068 | 0.84 | 1352 | 1413 | 1447 | 1465 | 1465 |  |
| Total | 1270 | 1.00 |  | 1473 | 1473 | 1473 | 1473 |  |  |

|  | Composition of Recovered Liquid g/batch | Diluted Crude Material | | Final Recovered Liquid | | | | Desalted Ash | |
|---|---|---|---|---|---|---|---|---|---|
|  |  | g/batch | weight ratio | 1st stage g/batch | 2nd stage g/batch | 3rd stage g/batch | 4th stage g/batch | g/batch | weight ratio |
| Solid Content | 230 | 0 | — | — | — | — | — | 230 | 0.50 |
| Salt Content | 235 | 32 | 0.16 | 234 | 121 | 60 | 26 | 9 | 0.02 |
| Water Content | 1068 | 172 | 0.84 | 1239 | 1352 | 1413 | 1447 | 221 | 48 |
| Total | 1533 | 204 | 1.00 | 1473 | 1473 | 1473 | 1473 | 460 | 1.00 |

Note:
The incinerated ash was made into an about 15 wt % slurry. An operation comprising separating the slurry into cake (solid content: about 50%) and a clear liquid in the separation unit, recovering the clear liquid, and adding the washing liquid to the cake to prepare an about 15 wt % slurry was repeated.

In the 5-stage washing treatment of Example 2, it is only the 5th stage that used fresh water. The medium to low concentration washing liquids used in the 1st, 2nd, 3rd, and 4th stages of the cycle are recovered liquids obtained in the 2nd, 3rd, 4th and 5th stages in the former cycle of the cycle, respectively.

Example 3

Figure 3:
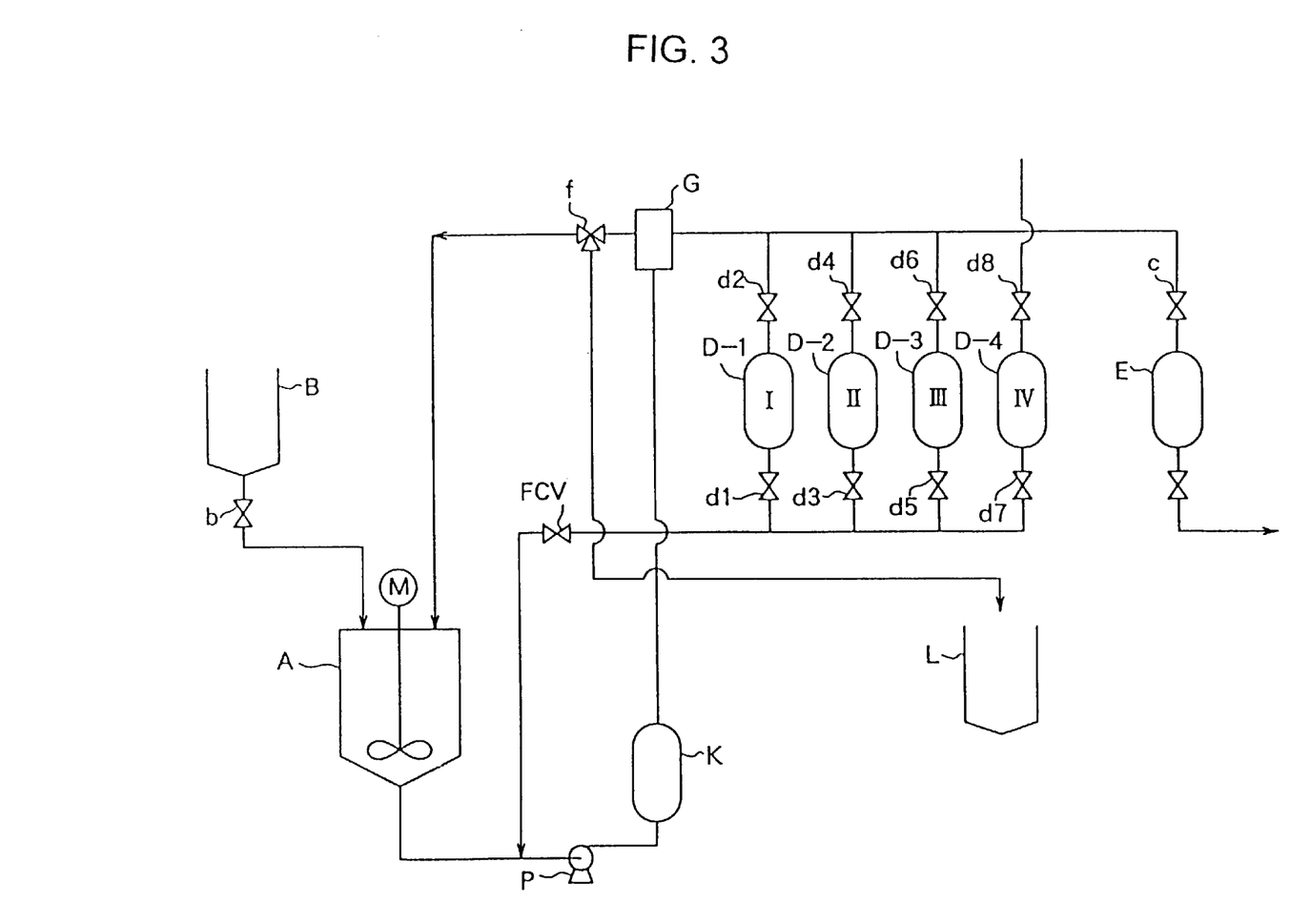
FIG. 3 schematically illustrates an example of the apparatus used for carrying out extraction according to the present invention, in which one tank is used for storing a crude material.

2-Butanol was extracted from a 5% aqueous solution of 2-butanol with kerosine (extracting reagent) by use of an apparatus having a single crude material tank as shown in FIG. 3.

First Stage

An aqueous 2-butanol solution stored in crude material storage tank B was transferred to crude material tank A by opening valve b. Valves c and d1 were then opened, and medium concentration extracting reagent I was fed from container D-1 to between tank A and pump P while controlling the flow rate by a flow control valve (FCV) and delivered together with the 2-butanol solution from tank A to mixing tank K which was provided to average the flow ratio in tank A. The mixture was then supplied to continuous type heavy liquid-light liquid separation unit G, where it was separated into a heavy liquid, i.e., the mixture from which 2-butanol had been extracted, and a light liquid, i.e., kerosine rich in 2-butanol. The heavy liquid was returned to tank A via valve f, while the light liquid was forwarded to recovered liquid tank E via valve c while maintaining the circulation from tank A through pump P, mixing tank K, and separation unit G back to tank A.

Second Stage

When container D-1 was evacuated, valves c and d1 were closed, and valves d2 and d3 were opened to let medium concentration extracting reagent II (whose concentration was less than that of medium concentration extracting reagent I) in container D-2 flow into the circulating liquid at a prescribed flow rate. The two liquids were brought into sufficient contact in mixing tank K and separation unit G and separated into a heavy liquid and a light liquid. The separated heavy liquid was returned to tank A, and the light liquid was sent to container D-1 through valve d2 for use as medium concentration extracting reagent I in the next extraction cycle.

Third Stage

When container D-2 was evacuated, valves d2 and d3 were closed, and valves d4 and d5 were opened to mix low concentration extracting reagent III (whose concentration was less than medium concentration extracting reagent II) in container D-3 into the circulating liquid at a prescribed flow rate. The two liquids were brought into sufficient contact in mixing tank K and separation unit G and separated into a heavy liquid and a light liquid. The separated heavy liquid was returned to tank A, and the light liquid was sent to container D-2 through valve d4 for use as medium concentration extracting reagent II in the next extraction cycle.

Final Stage

When container D-3 was evacuated, valves d4 and d5 were closed, and valves d6 and d7 were opened to mix extracting reagent IV (fresh kerosine) in container D-4 into the circulating liquid at a prescribed flow rate. The two liquids were brought into sufficient contact in mixing tank K and separation unit G and separated into a heavy liquid and a light liquid. The separated heavy liquid was delivered to extraction residue tank L via valve f, while the light liquid was sent to container D-3 through valve d6 for use as low concentration extracting reagent III in the next cycle. Thereafter fresh extracting reagent was fed to container D-4 through valve d8 and stored there ready for the next extraction cycle.

While the heavy liquid-light liquid separation unit used in Example 3 had a function for sufficiently mixing the liquid to be treated before separation, it is naturally possible to perform that function by providing the mixing tank K with a stirring mechanism, etc. to sufficiently mix up the two liquids. It is also possible to use a heavy liquid-light liquid separation unit having a function for separating solid matter or to equip the separation unit with a separate unit for separating solid matter.

The results of Example 3 are shown in Table 3 below.

TABLE 3

Liquid-Liquid Extraction with Single Crude Material Tank

|  | Crude Material g/batch | Medium Conc. Extracting Reagent I g/batch | Medium Conc. Extracting Reagent II g/batch | Low Conc. Extracting Reagent III g/batch | Extracting Reagent IV (kerosine) g/batch |
|---|---|---|---|---|---|
| Water | 1000 |  |  |  |  |
| 2-Butanol | 50 | 25 | 18 | 10 |  |
| Kerosine | — | 250 | 250 | 250 | 250 |
| Total | 1050 | 275 | 268 | 260 | 250 |

|  | Recovered Liquid | 1st Stage Residual Material | 2nd Stage Residual Material | 3rd Stage Residual Material | Final Residual Material |
|---|---|---|---|---|---|
| Water | 0 | 1000 | 1000 | 1000 | 1000 |
| 2-Butan9l | 31 | 44 | 37 | 29 | 19 |
| Kerosine | 250 |  |  |  |  |
| Total | 281 | 1044 | 1037 | 1029 | 1019 |

Note:
The test was carried out by repeating the operation comprising slowly adding the extracting reagent to the crude material, separating the mixture into a light liquid and a heavy liquid, and recovering the light liquid as an extract for use as an extracting reagent for the next cycle and the heavy liquid as a residual material.

The above-described extraction cycle was repeated for each batch to extract a desired quantity of the aqueous 2-butanol solution. The extracting reagents I, II, and III from the separation unit were stored in the respective containers and used in the next extraction cycle.

Example 4

Figure 4:
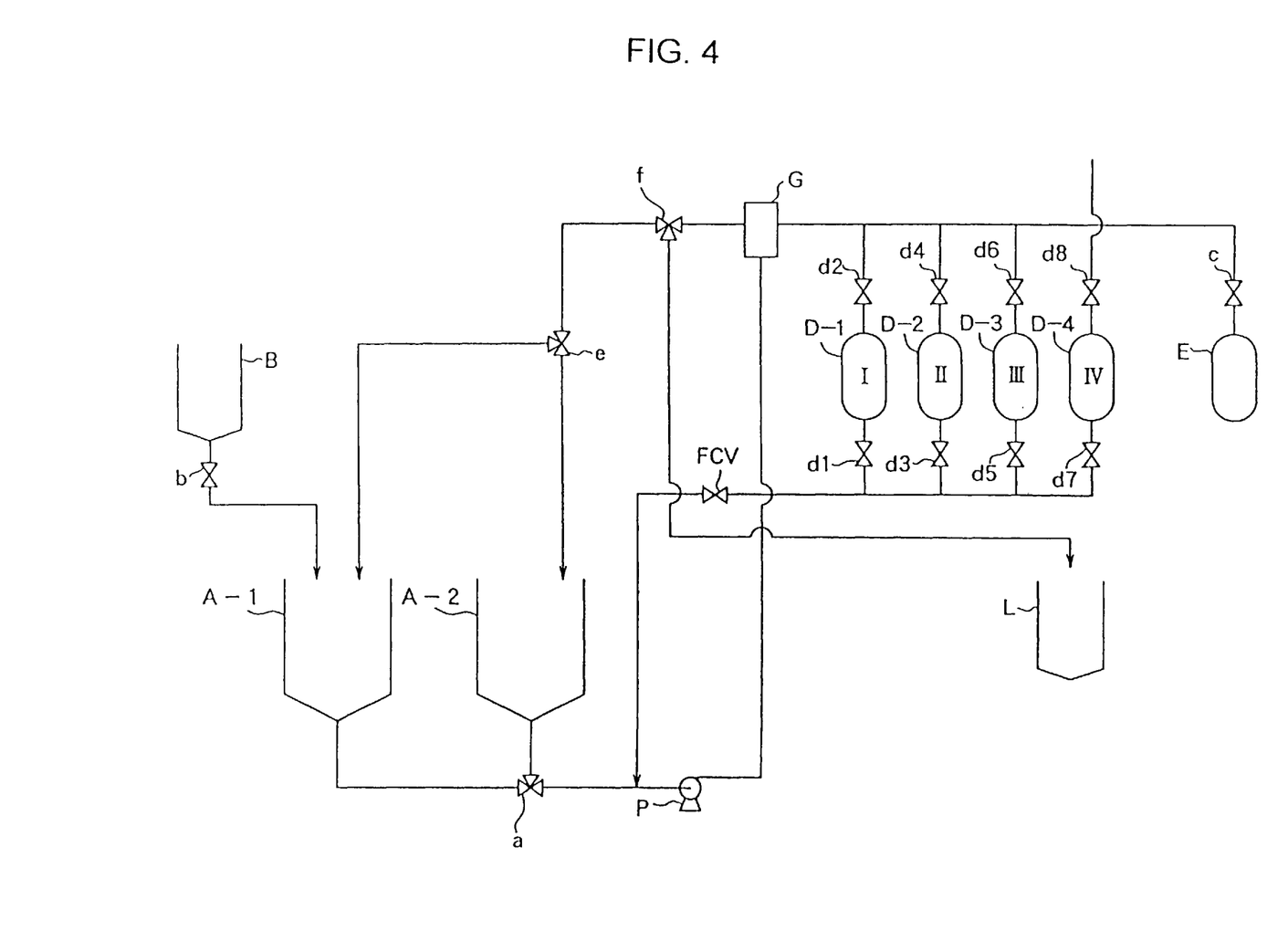
FIG. 4 schematically illustrates another example of the apparatus used for carrying out extraction according to the present invention, in which two tanks are used alternately for storing a crude material; wherein symbols indicate the following members.

2-Butanol was extracted from a 5% aqueous solution of 2-butanol with kerosine (extracting reagent) by use of an apparatus having two crude material tanks A-1 and A-2 as shown in FIG. 4.

An aqueous 2-butanol solution in crude material storage tank B was delivered to tank A-1 by operating valve b and treated in accordance with the same procedure as in Example 3 with the following exception. Where the aqueous 2-butanol solution was put in tank A-1, the separated heavy liquid from heavy liquid-light liquid separation unit G was sent to tank A-2. In the next stage, the heavy liquid separated from the aqueous solution fed from tank A-2 was returned to tank A-1. Like this tanks A-1 and A-2 were used alternately. More specifically, valves a, f, and e were operated so that the solution from tank A-1 was sent to separation unit G by means of pump P, and the heavy liquid separated in separation unit G was sent to tank A-2 through valves f and e. At the same time valves c and d1 were opened so that medium concentration extracting reagent I can flow from container D-1 into between valve a and pump P under control by FCV thereby to conduct extraction. The mixture was separated into a heavy liquid and a light liquid in the separation unit G, and the separated heavy liquid was put in tank A-2, while the light liquid was forwarded to recovery liquid tank E through valve c.

When the liquid level in tank A-1 fell sufficiently, the solution in tank A-2 was then treated. The whole amount of medium concentration extracting reagent I in container D-1 can have been exhausted by that time, or the medium concentration extracting reagent I may be used in a few divided portions to treat the solutions in tanks A-1 and A-2. It is not always necessary to synchronize the switching between tanks A-1 and A-2 with the end of withdrawal of the medium concentration extracting reagent I from container D-1. After a predetermined amount of the medium concentration extracting reagent I has been fed, feed of medium concentration extracting reagent II having a lower concentration than medium concentration extracting reagent I can be started.

After medium concentration extracting reagent I was used up, an extraction operation was continued by successively supplying medium concentration extracting reagent II of container D-2, low concentration extracting reagent III of container D-3 and, finally, fresh kerosine (extracting reagent IV) of container D-4 to carry out multi-stage extraction in the same manner as in Example 3. During the series of extraction operations, tanks A-1 and A-2 alternated in supplying the crude material to be treated and in receiving the separated heavy liquid.

At the very beginning of the operation, each of containers D-1, D-2 and D-3 may be filled with a fresh extracting reagent, which can be reused several times, or the concentration in each container may be adjusted previously.

The results of Example 4 are shown in Table 4 below.

TABLE 4

Liquid-Liquid Extraction with Two Crude Material Tanks

|  | Crude Material g/batch | Medium Conc. Extracting Reagent I g/batch | Medium Conc. Extracting Reagent II g/batch | Low Conc. Extracting Reagent III g/batch | Extracting Reagent IV (kerosine) g/batch |
|---|---|---|---|---|---|
| Water | 1000 | | | | |
| 2-Butanol | 50 | 28 | 22 | 12 | |
| Kerosine | 0 | 250 | 250 | 250 | 250 |
| Total | 1050 | 278 | 272 | 262 | 250 |
|  | Recovered Liquid | 1st Stage Residual Material | 2nd Stage Residual Material | 3rd Stage Residual Material | Final Residual Material |
| Water | | 1000 | 1000 | 1000 | 1000 |
| 2-Butanol | 33 | 45 | 39 | 29 | 17 |
| Kerosine | 250 | | | | |
| Total | 283 | 1045 | 1039 | 1029 | 1017 |

Note:
The test was carried out by repeating the operation comprising adding the extracting reagent to the crude material and recovering the extract separated as a light liquid in the separation unit for use as an extracting reagent for the next cycle.

While the invention has been described in detail and with reference to specific embodiments thereof, it will be apparent to one skilled in the art that various changes and modifications can be made therein without departing from the spirit and scope thereof.

This application is based on Japanese application No. Hei 10-139099 filed on Apr. 14, 1998, the entire contents of which are incorporated hereinto by reference.

What is claimed is:

1. A method for separating an objective component from a crude material in a multistage counter flow system, comprising:
   (a) contacting crude material stored in at least one tank with a washing liquid or an extracting reagent to form a mixture of the crude material and the washing liquid or extracting reagent;
   (b) separating the mixture into a recovered liquid containing the objective component and a residue, with the proviso that the mixture is not separated with a separation membrane that is connected to a tank containing the crude material; and
   repeating (a) and (b) at least once, wherein
   the washing liquid or extracting agent in at least first (a) contains the objective component before contact with the crude material; and
   the concentration of the objective component is successively lower in the washing liquid or extracting reagent before contact with the crude material in each (a).

2. The method of claim 1, wherein
   (b) is conducted in a separating means;
   the crude material is transferred to the separating means while feeding the washing liquid or extracting reagent to a system comprising the separating means and a transporting means connecting the at least one tank and the separating means, to form a mixture of the washing liquid or extracting reagent and the crude material; and
   the mixture is separated by the separating means into a recovered liquid having a higher concentration of the objective component than the washing liquid or extracting reagent and a residue.

3. The method of claim 1, wherein the crude material is stored in a single tank.

4. The method of claim 1, wherein the crude material is stored in two or more tanks alternately or successively.

5. The method of claim 1, wherein
   the recovered liquid obtained from the first (b) is taken out of the system; and
   the recovered liquid from each (b) other than the first (b) is returned to the system for use as the washing liquid or extracting reagent in (a) and (b) which is used for treating in the subsequent cycle to the batch feed of a raw material.

6. The method of claim 1, wherein a valuable substance is extracted into the recovered liquid in (b).

7. The method of claim 1, wherein a valuable substance is in the residue in (b).

8. The method of claim 1, wherein the crude material is a concentrated microbial cell suspension, a solution containing a dye or pigment, or an ash.

9. The method of claim 1, wherein the objective component is an amino acid, a metal or a salt.

10. The method of claim 1, wherein washing liquid is used in (a).

11. The method of claim 1, wherein an extracting reagent is used in (a).

12. The method of claim 1, wherein the washing liquid or extracting reagent in the last (a) contains no objective component.

13. The method of claim 1, wherein the washing liquid or extracting reagent is water, an alcohol, an amine, a chelating agent, an organic acid, an inorganic acid, an alkali solution, kerosine, or a heavy oil.

14. The method of claim 1, wherein (a) is conducted in a separating means.

15. The method of claim 14, wherein the separating means is a means for solid-liquid separation, liquid—liquid separation, liquid film separation, extraction, distillation, evaporation, adsorption, ion exchange, freezing separation, or crystallization.

16. The method of claim 1, wherein (a) and (b) are repeated at least twice.

17. The method of claim 1, wherein each recovered liquid from each (b) other than the first (b) is recycled to subsequent (a) and (b).

* * * * *